United States Patent
Rothenberg

(10) Patent No.: US 7,486,852 B2
(45) Date of Patent: Feb. 3, 2009

(54) APPARATUS AND METHOD FOR SUPPRESSION OF STIMULATED BRILLOUIN SCATTERING IN AN OPTICAL FIBER

(75) Inventor: Joshua E. Rothenberg, Los Angeles, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 555 days.

(21) Appl. No.: 11/186,480

(22) Filed: Jul. 20, 2005

(65) Prior Publication Data

US 2007/0019918 A1    Jan. 25, 2007

(51) Int. Cl.
G02B 6/26 (2006.01)
G02B 6/42 (2006.01)
(52) U.S. Cl. ............................................. 385/27
(58) Field of Classification Search ................. None
See application file for complete search history.

(56) References Cited

U.S. PATENT DOCUMENTS

| | | | |
|---|---|---|---|
| 5,848,215 A | 12/1998 | Akasaka et al. | |
| 6,360,042 B1 | 3/2002 | Long | |
| 6,542,683 B1 | 4/2003 | Evans et al. | |
| 6,587,623 B1 | 7/2003 | Papen et al. | |
| 6,678,294 B1 | 1/2004 | Komine et al. | |
| 6,856,740 B2 | 2/2005 | Balestra et al. | |

FOREIGN PATENT DOCUMENTS

EP    1 413 902 A1    4/2004

OTHER PUBLICATIONS

1. R.G. Smith, "Optical power handling capacity of low loss optical fibers as determined by stimulated Raman and Brillouin scattering," Appl. Opt., 11, 2489-2494 (1972). G.P. Agrawal, Nonlinear Fiber Optics, (Academic Press, 1995), Chapter 9.
2. A. Liem, J. Limpert, H. Zeller, and A. Tunnermann, Optics Letters 28, 1537 (2003).

(Continued)

Primary Examiner—Michelle R. Connelly-Cushwa
Assistant Examiner—Chris Chu
(74) Attorney, Agent, or Firm—Tarolli, Sundheim, Covell & Tummino LLP

(57) ABSTRACT

A technique for suppressing stimulated Brillouin scattering (SBS) in fibers intended to handle high powers. A fiber is embedded in an elongated embedding material to form an embedded fiber structure. The embedded fiber structure is formed either as a cantilevered beam or as one or more turns around a circular or elliptical path, and then the entire structure is deformed to apply a desired strain that varies along the fiber length and results in suppression of SBS. In one embodiment, the embedded fiber structure is deformed by applying lateral and generally diametric force across the turns of the structure, resulting in changes to its curvature. In another embodiment the embedded fiber structure initially has a helical shape, which is deformed by stretching or twisting to change its radius. In either embodiment, a desired strain profile is obtained by selecting the position of the fiber with respect to a neutral axis.

22 Claims, 2 Drawing Sheets

OTHER PUBLICATIONS

3. Hadjifotiou and G.A. Hill, "Suppression of stimulated Brillouin backscattering by PSK modulation for high-power optical transmission," IEE Proc. J 133 256-258 (1986).

4. L. Eskildsen, P.B. Hansen, U. Koren, B.I. Miller, M.G. Young, and K.F. Dreyer, "Stimulated Brillouin scattering suppression with low residual AM using a novel temperature wavelength-dithered DFB laser diode," Electron. Lett. 32, 1387-1389 (1996). See also US patent 6,678,294.

5. M. Ohashi and M. Tateda, "Design of a strain-free-fiber with nonuniform dopant concentration for stimulated Brillouin scattering suppression," J. Lightwave Technol. 11, 1941-1945 (1993).

6. K. Shiraki, M. Ohashi, and M. Tateda, "Suppression of stimulated Brillouin scattering in a fibre by changing the core radius," Electron. Lett. 31, 668-669 (1995).

7. N. Yoshizawa, et al., "Proposal for stimulated Brillouin scattering suppression by fibre cabling," Electron. Lett. 27, 1100-1101 (1991); N. Yoshizaw, et al. J. Light.

8. J. Hansryd et al, J Lightwave Technology 19 p1691 (2001).

9. Y. Jeong et al, Optics Letters 30, 459 (2005).

10. Q. Yu et al, Optics Letters 29, 1605 (2004).

11. G. A. Ball and W. W. Morey, "Compression tuned single frequency Bragg grating fiber laser," Optics Letters 19, 1979-1981 (1994).

12. A. Iocco et al, "Bragg grating fast tunable filter for wavelength division multiplexing," J. Lightwave Technology 17, 1217-1221 (1999).

13. S. Y. Set et al, "A widely tunable fiber Bragg grating with a wavelength tunability over 40 nm," OFC 2001, vol. 1, MC4-1—3 (2001).

14. M. Ibsen et al, Photonics Technology Letters 14, 21 (2002).

Marconi J D et al: "*Narrow Linewidth Fibre-Optical Wavelength Converter with Strain Suppression of SBS*"; Electronics Letters, IEE Stevenage, GB, vol. 40, No. 19, Sep. 16, 2004, pp. 1213-1214, XP006022666, ISSN: 0013-5194; The whole document.

International Search Report for corresponding PCT/US2006/027520 mailed Feb. 20, 2007 by Anna Maria Frisch of the EPO.

APPARATUS AND METHOD FOR SUPPRESSION OF STIMULATED BRILLOUIN SCATTERING IN AN OPTICAL FIBER

BACKGROUND OF THE INVENTION

This invention relates generally to optical fiber amplifiers and, more particularly, to techniques for suppression or reduction of stimulated Brillouin scattering (SBS) in fiber amplifiers. SBS is a well known nonlinear phenomenon that affects various types of optical components, including optical fibers. SBS is often explained in terms of three waves that propagate in a fiber: an incident wave, an acoustic wave and a reflected wave (sometimes referred to as the Stokes wave). When the incident wave reaches a certain power threshold, it excites an acoustic wave, which alters the optical properties of the fiber, including its refractive index. These changes result in scattering of the incident wave and creation of the reflected wave.

As a practical matter, the effect of SBS is to attenuate the incident wave and to limit the maximum power that can be transmitted through a fiber. Because SBS has a fairly narrow linewidth, typically less than 50 MHz (megahertz), a standard SBS suppression technique is to broaden the bandwidth of a laser used to generate the incident wave. This effectively reduces the SBS gain below the SBS threshold and limits the undesired effects of SBS. This approach, however, is incompatible with techniques commonly used for high power scaling of multiple fibers. Such scaling usually requires that the individual fibers have a very narrow bandwidth. Therefore, there is a need for a technique that reduces or suppresses SBS in fiber amplifiers that handle narrowband laser signals.

Of the techniques for SBS suppression that have been proposed, many involve modification of the fiber design and structure itself. While these approaches may be useful in some applications, they are difficult to incorporate into fiber configurations in high power amplifiers. Other approaches have utilized external modifications to fibers to achieve SBS suppression. In particular, it is known that temperature variation and mechanical strain can be used to effectively broaden the SBS linewidth and thereby achieve reduction or suppression of SBS. In particular, the SBS resonance frequency has been observed to vary approximately linearly over modest ranges of temperature and strain. The coefficients of proportionality depend on the specifics of fiber design and composition, but have been observed in the range of 1-2 MHz/° C. for a temperature gradient. See, e.g., J. Hansryd et al., *J. Lightwave Technology* 19, p. 1691 (2001). Strain has been observed to affect the SBS resonance frequency by approximately 100 kHz/µE, where PE refers to "microstrain" (i.e. a fractional change in length of $10^{-6}$). See, e.g., N. Yoshizawa et al., "Proposal for stimulated Brillouin scattering suppression by fibre cabling," Electron. Lett. 27, 1100-1101 (1991). More specifically, researchers in this field have observed a temperature induced enhancement of SBS resonance by a factor of approximately 2.5 for a temperature gradient of 100° C. (see, e.g., Hansryd et al).

Although the experimental use of temperature gradients for SBS suppression is encouraging, unfortunately these results are based on the use of fiber output powers on the order of a few 100 W. In the application of a high power fiber amplifier, for example, the typical SBS threshold is ~100 W. See, e.g., A. Liem, et al, Optics Letters 28, 1537 (2003). Therefore, scaling up to much higher SBS thresholds of 2 kW, e.g., would require broadening the effective SBS linewidth by a factor of approximately 20, to approximately (20×50 MHz=)1 GHz. Obviously, for very high signal powers the use of temperature gradients for SBS suppression is limited by practical considerations imposed by the fiber temperature.

Alternatively, the use of strain to broaden SBS linewidth also has practical limitations. Achieving a broadening to approximately 1 GHz would require a strain of about 1% (10,000µε). Although significant tensile strain in glass fibers is possible, and the strain limit imposed by fracture is approximately 6%, the routine application of large tensile strain to glass fibers raises significant concerns about fiber degradation and reliability. Constant strains applied compressively have been used in fiber Bragg gratings (FBGs), without any apparent degradation. FBGs, however, typically employ quite short fibers. Prior to the present invention no-one has suggested how to apply a fiber compression gradient to relatively long fibers handling high powers. Accordingly, there is still a significant need for a technique that suppresses or reduces SBS in fibers that handle high powers. The present invention is directed to this end.

SUMMARY OF THE INVENTION

The present invention resides in optical fiber apparatus for suppressing stimulated Brillouin scattering (SBS). Briefly, and in general terms, the apparatus comprises an optical fiber of length suitable for providing high output powers; an embedding material formed into an elongated mass surrounding the fiber and forming an embedded fiber structure; and means for deforming the embedded fiber structure in such a manner as to apply a strain gradient to the fiber along its length. The embedded fiber structure may take the form of a cantilevered beam or may be wrapped in an initial configuration as one or more turns around a circular or elliptical path, and has a longitudinal neutral axis, along which zero strain is presented when the structure is deformed from its initial configuration. The fiber is positioned in the embedding material at a selected offset distance from the neutral axis and the selected offset distance is varied along the length of the fiber.

In one embodiment of the invention, the embedded fiber structure is initially formed into a helical shape and the means for deforming the embedded fiber structure comprises means for deforming the helical shape of the structure to effect a change in its radius, which results in a varying strain being applied to the fiber, depending on its distance from the neutral axis. Specifically, the fiber is positioned in a direction with respect to the neutral axis that results in a varying compressive strain being applied to the fiber. If the means for deforming the embedded fiber structure effects a decrease in the radius of the helical structure, then the fiber has an inner position with respect to the neutral axis.

In another embodiment of the invention, the means for deforming the embedded fiber structure comprises means for applying a generally diametric force across the one or more turns of the structure, resulting in a change in radius at the points of application of force and an opposite change in radius at points midway between the points of application of the force. Therefore, a varying strain is applied to the fiber based on a combination of the changes in bending radius and on variations of distance of the fiber from the neutral axis. By appropriate selection of the fiber positions, a varying compressive strain can be applied to the fiber over a selected part of its length, or over practically its entire length. Specifically, the fiber is placed at an outside position with respect to the neutral axis for those portions of the fiber that are subject to a decrease in curvature as a result of the applied force, and is placed at an inside position with respect to the neutral axis for those portions of the fiber that are subject to an increase in curvature as a result of the applied force.

In accordance with another aspect of the invention, the apparatus further comprises means for applying a temperature gradient along the fiber length, to further enhance suppression of SBS.

In terms of a method for reducing stimulated Brillouin scattering (SBS) in an optical fiber, the invention comprises the steps of forming an elongated embedded fiber structure comprising a fiber and an embedding material having a neutral axis that is subject to no strain when the elongated fiber structure is deformed by bending; placing the embedded fiber structure in an initial strain-free configuration; and deforming the embedded fiber structure from its initial configuration and thereby subjecting at least portions of the fiber to a strain gradient along its length, whereby the strain gradient has the effect of reducing SBS. The initial configuration may be a cantilevered beam or may comprise one or more windings of circular or elliptical shape.

In particular, the strain gradient is determined by a combination of varying the bending radius of the embedded fiber structure as a result of the deforming step; and varying the distance of the fiber with respect to the neutral axis. The method may further comprise applying a temperature gradient along the fiber length, to further enhance suppression of SBS.

It will be appreciated from the foregoing that the present invention represents a significant advance in SBS reduction in optical fibers operated at high powers. In particular, the application of a mechanical strain gradient to a fiber functions to suppress SBS. Other aspects and advantages of the invention will become apparent from the following more detailed description, taken in conjunction with the accompanying drawings.

DETAILED DESCRIPTION OF THE INVENTION

Figure 1:
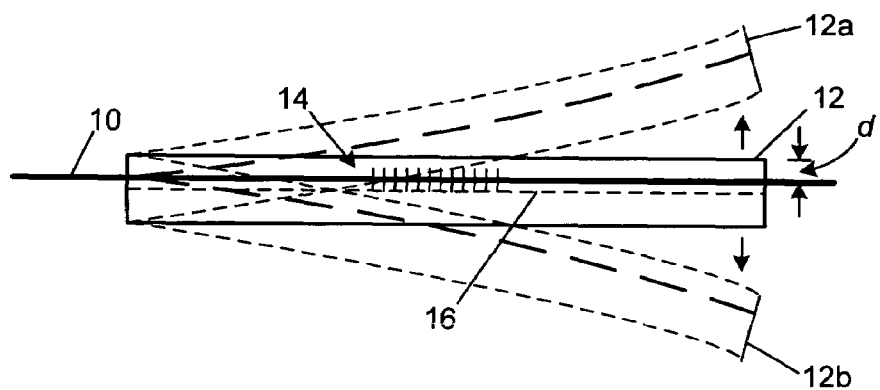
FIG. 1 is a diagrammatic view of cantilever beam used to impose strain on a fiber Bragg grating (FBG) device of the prior art.

As shown in the drawings for purposes of illustration, the present invention is concerned with suppression of stimulated Brillouin scattering (SBS) in high power fibers. Although a constant strain has been applied to fiber Bragg gratings (FBGs) of relatively short length, adaptation of this technique to much longer, very high power fibers has prior to this invention appeared to be impractical.

In accordance with the invention, relatively long fibers capable of handling high powers are subjected to varying amounts of compressive strain to reduce or suppress SBS. The strain variation may be combined with the application of a temperature gradient to the fibers, to enhance further the suppression of SBS.

FIG. 1 depicts a technique used in the prior art to apply strain to fibers incorporating strain-sensitive devices, specifically FBG devices. A fiber, indicated by the solid line 10, is embedded a deformable cantilever beam 12 and includes an FBG 14 along part of its length. The fiber 10 is located to one side of a neutral axis 16 of the beam 12. Therefore, when the beam 12 is deformed in a direction that effectively shortens the embedded fiber length, as indicated by the position 12a of the beam, the fiber is subject to compression. Conversely, if the beam 12 is deformed in the opposite direction that effectively lengthens the embedded fiber length, as indicated by the position 12b of the beam, then the fiber is subject to tension.

Figure 2:
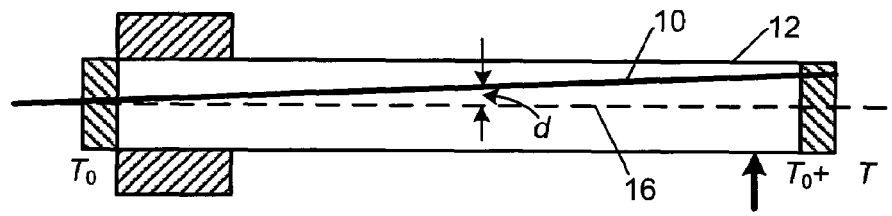
FIG. 2 is a diagrammatic view similar to FIG. 1, but modified, in accordance with one aspect of the invention, to provide a compressive strain gradient along the length of a fiber, and also showing the use of a temperature gradient in combination with the compressive strain gradient.

The amount of compressive or tensile strain imposed on the fiber 10 depends on the degree of deformation of the beam 12 and on the distance d between the fiber and the neutral axis 16. For use in FBG devices, the beam 12 is configured to apply a constant strain over the length of the device. That is to say, the distance d is maintained constant, as shown in FIG. 1. However, to effectively broaden the fiber SBS linewidth with the use of strain one must create a strain gradient so that the SBS resonance is shifted over the length of the fiber. As shown in FIG. 2, for example, the fiber 10 may be embedded in the beam 12 such that the offset d between the fiber and neutral axis 16 varies along the length of the beam. Applying a constant deformation force to the beam 12 will, therefore, subject the fiber 10 to a strain gradient along its length. Numerically, the strain is directly proportional to d and inversely proportional to the radius R of the arc of the deformed beam 12. That is. $\epsilon = d/R$. A temperature gradient may also be applied between the ends of the beam 12 to enhance the effect of the strain gradient, as indicated by the temperature differential $\Delta T$ in FIG. 2. The principle illustrated by FIGS. 1 and 2 can be usefully employed in devices, such as FBGs, where the fiber lengths are manageably short. For example, a beam 12 as illustrated in FIG. 2 may be 10 cm long and provide a strain of 3% or more if the value of d is approximately 1 cm and beam deformation is approximately 1.5 cm. In other fiber applications, the deformable beam concept is not quite as useful because fiber lengths must be too great. For example, typical fiber amplifiers may be longer than 1-2 m.

Figure 3:
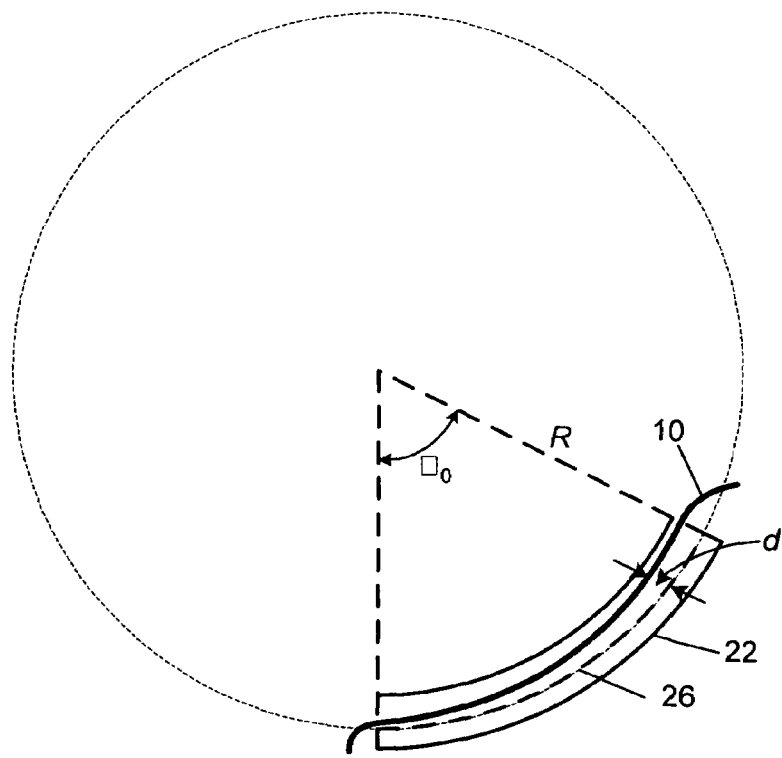
FIG. 3 is a diagrammatic view of an arcuate length of fiber embedded at a varying distance from the neutral bending axis of the embedded fiber structure.

In the FIG. 3 embodiment, the fiber 10 is embedded in a beam 22 formed in a circular or elliptical shape If the initial radius is $R_0$ over an arc of angle $\theta_0$, and the arc is bent to a new radius $R = R_0 + \Delta R$, the neutral axis 26 (which is generally not centered in the beam) conserves arc length: $\theta = \theta_0 + \Delta\theta$, or to first order $\Delta\theta/\theta_0 = -\Delta R/R_0$. The strain on a fiber at distance d from the neutral axis is then given by:

$$\epsilon \cong (\Delta R/R_0)(d/R_0).$$

Figure 4:
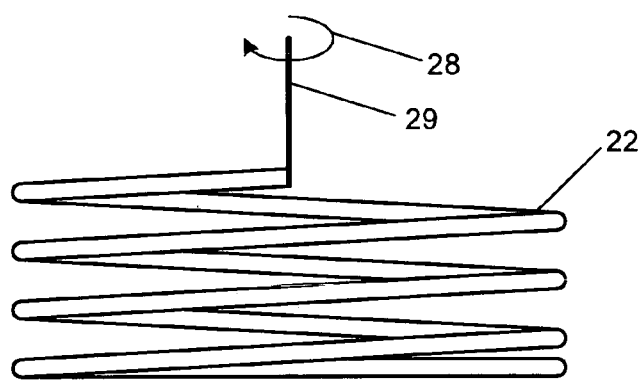
FIG. 4 is a diagrammatic side view of an embedded fiber structure of the type shown in FIG. 3, extended to include multiple turns or windings.

Thus, in the FIG. 3 configuration there are two parameters that can be changed over the length of the fiber to vary the strain, d and $\Delta R$. For longer fibers one would like to make multiple loops around such a device. One such embodiment is simply to lengthen the curved beam in FIG. 3 to an arc length $\theta_0$ greater than $2\pi$ by extension of the arc into a helical "spring" shape out of the plane of FIG. 3, as shown diagrammatically in FIG. 4. Strain could then be applied simply twisting the helical "spring" beam 22, as indicated by arrow 28 (or by stretching the helical beam 22 along the longitudinal axis 29), and positioning the fiber 10 on the correct side of the neutral axis, will result in compression because the twisting (or stretching) action necessarily changes the radius R. For example, if both $d/R_0$ and $\Delta R/R_0$ are approximately 10%, then a strain of approximately 1% would result. In this embodiment the beam curvature is constant over the entire length of the device and the strain gradient is created by varying the fiber-neutral axis separation distance d, e.g. as shown in FIG. 3. Note that the distance d can be varied in a periodic or non-periodic fashion, and that either more or less than one period of this variation can be used per loop of the embedded fiber. For example, if the maximum strain gradient is desired over a short fiber length, the distance d can be varied over a fully cycle in this short fiber length. For effective suppression of SBS one generally desires the strain gradient to be shorter than the length of the fiber where the maximum signal intensity occurs. E.g. in the application of a fiber amplifier, where the pump beam is counter propagating to the amplified signal beam, the fiber length of the maximum signal intensity is typically equal to the pump beam absorption length.

Figure 5:
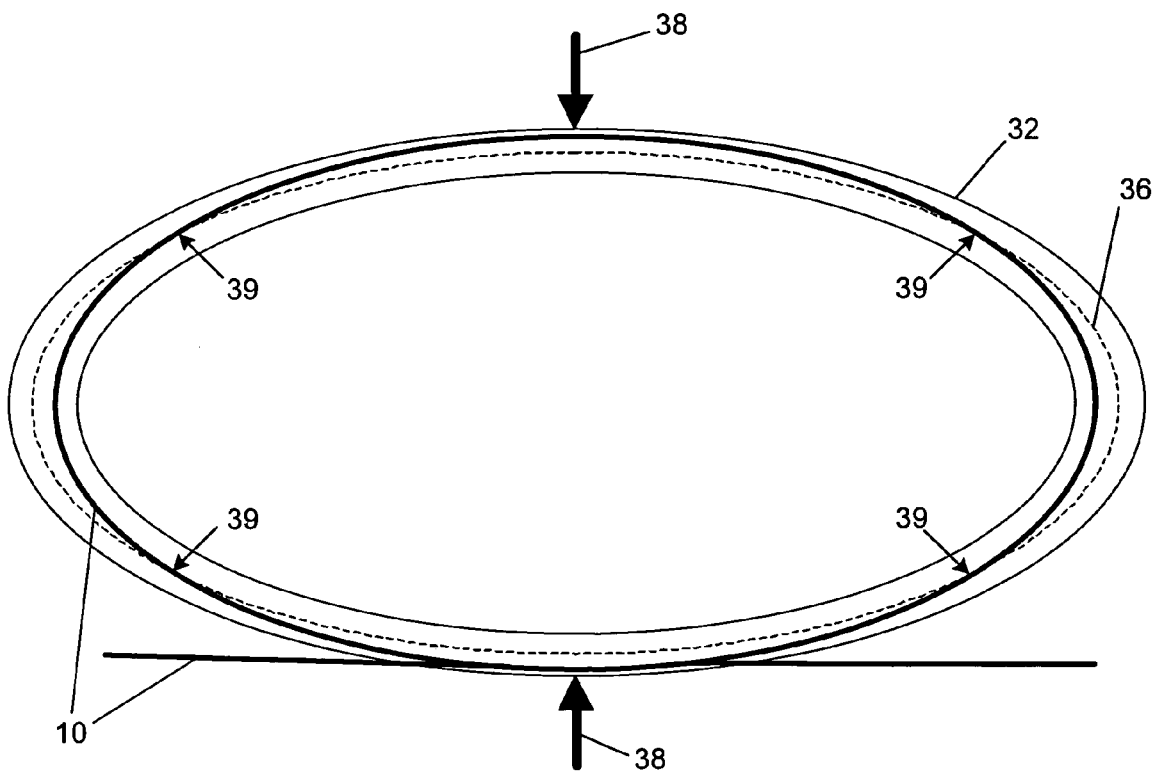
FIG. 5 is a top view of an elliptical or cylindrical form that is deformable in accordance with another embodiment of the invention, to apply a strain gradient to an embedded fiber.

An example of another widely applicable embodiment based on this type of approach is shown in FIG. 5. The fiber 10 is imbedded in a beam 32 of circular or elliptical shape, as shown in the figure, and having a neutral axis 36. The fiber 10 may make multiple loops around this form (as the example shows) and may be wound in a helical pattern (i.e. each loop displaced in the direction out of the plane of FIG. 5) to assist in heat transfer if needed. Before a load is applied the fiber 10 can be embedded such that the distance between the fiber and the neutral axis is varied in an arbitrary desired fashion. A load is then applied to distort the circular or elliptical profile. In the example of FIG. 5, a load is applied at the "top" and "bottom" of the device, as indicated by the arrows 38. If the load is applied by a compressive force as illustrated, this results in a local reduction in beam curvature (i.e., an increase in radius of curvature) at the points of application of the load, and an increase in beam curvature at the mid-points between these points of application of the load. (It will be understood, however, that the structure may also be loaded by application of a tensile force across its "diameter," or by other combinations of forces applied to the structure.) To keep the fiber 10 in compression everywhere along its length, the fiber crosses over the neutral axis 36 at points 39 where the local beam curvature is unchanged by the load. Thus, the strain given by the expression $\epsilon \cong (\Delta R/R_0)(d/R_0)$ is maintained as compression everywhere along the fiber length. The strain approaches zero four times per fiber loop, and peaks at a maximum value four times per loop (at the top, bottom, left and right of the figure). Again, temperature gradients may be added to further increase the linewidth broadening effect. Given the flexibility of designing the two varying parameters in the foregoing expression for strain, any of a number of other similar designs may be used to maintain fiber compression in a winding geometry such as FIG. 5.

It will be appreciated from the foregoing that the present invention represents a significant advance in techniques for suppression of SBS in fibers carrying high powers. In particular, the invention provides for reduction of suppression of SBS by applying a strain gradient to a long optical fiber. Preferably, the strain gradient is compressive rather than tensile, and may be combined with a temperature gradient to further enhance the SBS suppression effect. It will also be appreciated that although specific embodiments of the invention have been illustrated and defined in detail, various modifications may be made without departing from the spirit and scope of the invention. Accordingly, the invention should not be limited except as by the accompanying claims.

The invention claimed is:

1. Optical fiber apparatus for suppressing stimulated Brillouin scattering (SBS), the apparatus comprising:

an optical fiber of length suitable for carrying high powers;
an embedding material formed into an elongated mass surrounding the fiber and forming an embedded fiber structure having an initially strain-free configuration that is wrapped as one or more turns around a generally circular or elliptical path to form the initial configuration; and
means for deforming the embedded fiber structure in such a manner as to apply a strain gradient to the fiber along its length;
wherein the embedded fiber structure has a longitudinal neutral axis, along which zero strain is presented when the structure is deformed from its initial configuration, and wherein the fiber is positioned in the embedding material at a selected offset distance from the neutral axis and the selected offset distance varies along the length of the fiber.

2. Optical fiber apparatus as defined in claim 1, wherein:
the initial configuration of the embedded fiber structure is a cantilevered beam; and
the means for deforming the embedded fiber structure applies a bending force to the beam.

3. Optical fiber apparatus as defined in claim 1, wherein:
the embedded fiber structure is initially formed into a generally helical shape; and
the means for deforming the embedded fiber structure comprises means for deforming the helical shape of the structure to effect a change in its radius, which results in a varying strain being applied to the fiber, depending on its distance from the neutral axis.

4. Optical fiber apparatus as defined in claim 3, wherein:
the fiber is positioned in a direction with respect to the neutral axis that results in a varying compressive strain being applied to the fiber.

5. Optical fiber apparatus as defined in claim 4, wherein:
the means for deforming the embedded fiber structure effects a decrease in the radius of the helical structure; and
the fiber has an inner position with respect to the neutral axis.

6. Optical fiber apparatus as defined in claim 4, wherein:
the means for deforming the embedded fiber structure effects an increase in the radius of the helical structure; and
the fiber has an outer position with respect to the neutral axis.

7. Optical fiber apparatus as defined in claim 1, wherein:
the means for deforming the embedded fiber structure comprises means for applying diametric force to one or more turns of the structure, resulting in a change in radius at the points of application of force and an opposite change in radius at points midway between the points of application of the force, wherein a varying strain is applied to fiber based on a combination of the changes in radius of bending and varying distance from the neutral axis.

8. Optical fiber apparatus as defined in claim 7, wherein:
the position of the fiber with respect to the neutral axis is selected to result in a varying compressive strain being applied to the fiber over practically its entire length.

9. Optical fiber apparatus as defined in claim 8, wherein:
the fiber is placed at an outside position with respect to the neutral axis for those portions of the fiber that are subject to a decrease in curvature as a result of the applied force, and is placed at an inside position with respect to the neutral axis for those portions of the fiber that are subject to an increase in curvature as a result of the applied force.

10. Optical fiber apparatus as defined in claim 7, wherein the embedded fiber structure comprises multiple turns in a helical arrangement to facilitate heat transfer.

11. Optical fiber apparatus as defined in claim 1, and further comprising:
   means for applying a temperature gradient along the fiber length, to further enhance suppression of SBS.

12. A method for reducing stimulated Brillouin scattering (SBS) in an optical fiber, comprising:
   forming an elongated embedded fiber structure comprising a fiber and an embedding material having a neutral axis that is subject to no strain when the elongated fiber structure is deformed by bending;
   placing the embedded fiber structure in an initial strain-free configuration;
   deforming the embedded fiber structure from its initial configuration and thereby subjecting at least portions of the fiber to a strain gradient along its length, whereby the strain gradient has the effect of reducing SBS; and
   applying a temperature gradient along the fiber length, to further enhance suppression of SBS.

13. A method as defined in claim 12, wherein:
   the strain-free configuration is a cantilevered beam; and
   the deforming step comprises applying a bending force to the beam.

14. A method as defined in claim 12, wherein the initial configuration comprises one or more windings of circular or elliptical shape.

15. A method as defined in claim 14, wherein the strain gradient is determined by a combination of:
   varying the bending radius of the embedded fiber structure as a result of the deforming step; and
   varying the distance of the fiber with respect to the neutral axis.

16. A method as defined in claim 14, wherein:
   the step of placing the embedded fiber structure in a strain-free configuration comprises forming the embedded structure into a helical shape;
   the step of deforming the embedded fiber structure comprises deforming the helical shape to effect a change in its radius; and
   the strain gradient results from varying the distance of the fiber with respect to the neutral axis.

17. A method as defined in claim 16, wherein the step of forming the embedded fiber structure comprises:
   positioning the fiber in a direction with respect to the neutral axis that results in a varying compressive strain being applied to the fiber.

18. A method as defined in claim 17, wherein:
   the deforming step effects a decrease in the radius of the helical structure; and
   the fiber has an inner position with respect to the neutral axis.

19. A method as defined in claim 17, wherein:
   the deforming step effects a increase in the radius of the helical structure; and
   the fiber has an outer position with respect to the neutral axis.

20. A method as defined in claim 14, wherein:
   the deforming step comprises applying diametric force to one or more turns of the structure, resulting in a change in radius at the points of application of force and an opposite change in radius at points midway between the points of application of the force, wherein a varying strain is applied to the fiber based on a combination of the changes in radius of bending and a varying distance of the fiber from the neutral axis.

21. A method as defined in claim 20, and further comprising:
   selecting the position of the fiber with respect to the neutral axis to result in a varying compressive strain being applied to the fiber over practically its entire length.

22. A method as defined in claim 21, wherein:
   selecting the position of the fiber comprises placing the fiber at an outside position with respect to the neutral axis for those portions of the fiber that are subject to a decrease in curvature as a result of the applied force, and placing the fiber at an inside position with respect to the neutral axis for those portions of the fiber that are subject to an increase in curvature as a result of the applied force.

* * * * *